(12) United States Patent
Okamoto (10) Patent No.: US 11,279,330 B2
(45) Date of Patent: Mar. 22, 2022

(54) BRAKING FORCE CONTROL APPARATUS FOR A VEHICLE

(71) Applicant: Toyota Jidosha Kabushiki Kaisha, Toyota (JP)

(72) Inventor: Yuki Okamoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 202 days.

(21) Appl. No.: 16/715,635

(22) Filed: Dec. 16, 2019

(65) Prior Publication Data

US 2020/0189535 A1 Jun. 18, 2020

(30) Foreign Application Priority Data

Dec. 17, 2018 (JP) .............................. JP2018-235315

(51) Int. Cl.
*B60T 8/17* (2006.01)

(52) U.S. Cl.
CPC ............. *B60T 8/17* (2013.01); *B60T 2201/04* (2013.01); *B60T 2201/06* (2013.01); *B60T 2260/09* (2013.01)

(58) Field of Classification Search
CPC .... B60T 8/17; B60T 2260/09; B60T 2201/04; B60T 2201/06; B60T 7/12; B60W 30/18027; B60W 30/18109; B60W 40/105; B60W 2420/52; B60W 2710/18
See application file for complete search history.

(56) References Cited

U.S. PATENT DOCUMENTS

| 2002/0033642 | A1 | 3/2002 | Holl |
| 2003/0033073 | A1 | 2/2003 | Kichima et al. |
| 2008/0294319 | A1* | 11/2008 | Baijens ...................... B60T 8/24 701/70 |
| 2009/0076701 | A1* | 3/2009 | Inoue ...................... B60W 30/16 701/93 |
| 2012/0046844 | A1 | 2/2012 | Okada et al. |
| 2012/0203433 | A1* | 8/2012 | Higa ...................... B60T 13/745 701/50 |
| 2013/0006490 | A1* | 1/2013 | Takagi ............ B60W 30/18036 701/99 |
| 2017/0043767 | A1* | 2/2017 | Khafagy ............... B60W 10/06 |

(Continued)

FOREIGN PATENT DOCUMENTS

| JP | 2002-104147 A | 4/2002 |
| JP | 2003-034240 A | 2/2003 |

(Continued)

*Primary Examiner* — Sze-Hon Kong
(74) *Attorney, Agent, or Firm* — Dinsmore & Shohl LLP (57) ABSTRACT

A braking force control apparatus for a vehicle has a control unit that executes a braking force reduction control that controls a braking device such that a braking force is gradually reduced when it is determined that a drive request for driving the vehicle is generated during execution of the braking force holding control for controlling the braking device to hold a braking force applied to the vehicle when the vehicle stops in the uphill direction on a slope. The control unit controls the braking device such that the braking force during execution of the braking force reduction control is larger when the drive request is generated by the driving support control than when the drive request is generated by the driver's driving operation.

8 Claims, 6 Drawing Sheets

(56) References Cited

U.S. PATENT DOCUMENTS

| | | | |
|---|---|---|---|
| 2018/0126965 A1 | 5/2018 | Tsuji | |
| 2018/0148063 A1 | 5/2018 | Tatsushiro et al. | |
| 2020/0047727 A1* | 2/2020 | Shimada | B60T 7/22 |

FOREIGN PATENT DOCUMENTS

| | | |
|---|---|---|
| JP | 2010-269671 A | 12/2010 |
| JP | 2018-070103 A | 5/2018 |
| JP | 2018-083602 A | 5/2018 |

* cited by examiner

BRAKING FORCE CONTROL APPARATUS FOR A VEHICLE

CROSS-REFERENCE TO RELATED APPLICATION

This application claims priority to Japanese Patent Application No. JP2018-235315 filed on Dec. 17, 2018, the content of which is hereby incorporated by reference in its entirety into this application.

BACKGROUND

1. Technical Field

The present disclosure relates to a braking force control apparatus for a vehicle such as an automobile.

2. Description of the Related Art

As control of braking force in a vehicle such as an automobile, as described, for example, in Japanese Patent Application Laid-open No. 7002-104147, hill start assist control performed when a vehicle stops and starts in the uphill direction on a slope is known. Hill start assist control consists of braking force holding control and braking force reduction control.

The braking force holding control is executed when a vehicle decelerates and stops by braking while the vehicle is traveling uphill on a slope and a preset braking force holding condition is satisfied, and the stopped state of the vehicle is maintained by holding the braking force applied to the vehicle. The braking force reduction control is executed when a drive request for starting the vehicle is generated in a state where the braking force holding control is being performed, and the braking force is released after a predetermined time has elapsed since the drive request is generated, or the braking force is gradually reduced in the process of a required driving force being increased.

In particular, in the braking force reduction control, the braking force may be gradually reduced such that the vehicle is prevented from sliding down along the slope due to lack of braking force and, in addition, a driver does not feel a sense of getting stuck due to remaining of an excessive braking force and start delaying of the vehicle.

By the way, as traveling control for a vehicle such as an automobile, driving support control by which a vehicle is braked and driven without requiring a driver's braking driving operation such as, for example, inter-vehicle distance control in all vehicle speed range is known. The hill start assist control may be performed not only in a vehicle that is braked and driven by a driver's braking/driving operation but also in a vehicle in which the driving support control is performed.

If a braking force is controlled to be reduced promptly so as to reduce the possibility that the driver feels a sense of getting stuck when a drive request is generated by the driver's driving operation, there is a high possibility that the vehicle may slip down due to an insufficient braking force when a drive request is generated by the driving support control. Conversely, if the braking force is controlled to decrease slowly so as to reduce the possibility of the vehicle sliding down when a drive request is generated by the driving support control, there is a high possibility that the driver may feel a sense of getting stuck due to an excessive braking force remaining when a drive request is generated by the driver's driving operation.

Furthermore, in a vehicle such as an automobile, a braking force actually generated may be lower than a target braking force for control due to a decrease in a gain of the braking force control or deterioration with time of friction members of a braking device. In a situation where a braking force is lower as above, when the braking force reduction control is executed, there is a high possibility that the vehicle may slip down due to an insufficient braking force.

In particular, even if the vehicle slips down while a driver is driving, the driver can perform a braking operation to quickly cope with the slippage. However, if the vehicle slips down while the driving support control is being performed and the driver is not performing driving operation, he or she cannot promptly perform braking operation to cope with the slippage.

SUMMARY

The present disclosure provides a braking force control apparatus which is improved to reduce the risk of sliding down of a vehicle when the braking force reduction control is performed during an execution of the driving support control while avoiding the possibility that a driver may feel a sense of getting stuck when the braking force reduction control is performed during driving operation being performed by the driver.

According to the present disclosure, a braking force control apparatus for a vehicle is provided which comprises a braking device for applying a braking force to a vehicle and a control unit for controlling the braking device, and the control unit is configured to execute braking force holding control for controlling the braking device to hold a braking force applied to the vehicle when the vehicle is stopped in the uphill direction on a slope, and execute braking force reduction control for controlling the braking device so that the braking force is gradually reduced when it is determined that a drive request for driving the vehicle is generated during execution of the braking force holding control.

The vehicle has a driving support device configured to perform driving support control that automatically brakes and drives the vehicle without requiring a driver's braking/driving operation.

The control unit is configured to control the braking device such that the braking force during execution of the braking force reduction control is larger when a drive request is generated by the driver's driving operation than when a drive request is generated by the driving support control.

According to the above configuration, a braking force during execution of the braking force reduction control is controlled to be larger when a drive request is generated by the driving support control than when a drive request is generated by the driver's driving operation.

Therefore, compared to where a braking force when a drive request is generated by the driving support control is the same as a braking force when a drive request is generated by the driver's driving operation, it is possible to reduce the possibility of the vehicle slipping down when the braking force reduction control is performed during the execution of the driving support control. Further, since the braking force is not increased when a drive request is generated by the driver's driving operation, it is possible to avoid an increase in the possibility that the driver may feel a sense of getting stuck when braking force reduction control is executed during the drive s driving operation.

Further, the braking force when a drive request is generated by the driving support control is larger than the braking force when a drive request is generated by the driver's driving operation. Therefore, even if a braking force actually generated becomes lower than a target braking force for the control due to a decrease of a gain of the braking force control or the like, it is possible to reduce the possibility of the vehicle sliding down due to a lack of the braking force when the braking force reduction control is executed during the execution of the driving support control.

In one aspect of the present disclosure, the vehicle has a required driving force estimation device configured to estimate a required driving force of the drive request in both cases where the drive request is generated by the driving support control and where the drive request is generated by a driver's driving operation, and the control unit is configured to calculate a target braking force which gradually decreases according to an increase of the estimated required driving force, and control the braking device such that a braking force applied to the vehicle becomes the target braking force.

According to the above aspect, a target braking force is calculated to gradually decrease according to an increase of the required driving force estimated by the required driving force estimation device, and the braking device is controlled such that a braking force applied to the vehicle becomes the target braking force.

Therefore, the target braking force can be calculated to an appropriate value according to the required driving force as compared to where the target braking force is not calculated so as to gradually decrease according to an increase of the required driving force. Accordingly, it is possible to effectively reduce the possibility that the vehicle may slip down when the braking force reduction control is performed during the execution of the driving support control while effectively avoiding the possibility that the driver may feel a sense of getting stuck when the braking force reduction control is executed during a driving operation is being made by the driver.

In another aspect of the present disclosure, the vehicle has a lowering force estimation device configured to estimate a lowering force that cause the vehicle to descend along the slope due to the gravity, and the control unit is configured to calculate a target braking force such that the target braking force at the time when a magnitude of the required driving force becomes equal to the lowering force is greater when the drive request is generated by the driving support control than when the drive request is generated by the driver's driving operation.

According to the above aspect, a target braking force at the time when a magnitude of the required driving force becomes equal to the lowering force estimated by the lowering force estimation device is calculated so as to be larger when the drive request is generated by the driving support control than when the drive request is generated by the driver's driving operation. Therefore, a braking force can be applied to the vehicle even when a magnitude of the required driving force becomes equal to the lowering force estimated by the lowering force estimation device, so that it is possible to effectively reduce the possibility that the vehicle may slip down when the braking force reduction control is performed during the execution of the driving support control.

Further, in another aspect of the present disclosure, the control unit is configured to calculate the target braking force when the drive request is generated by the driving support control to a value that is larger than the target braking force when the drive request is generated by the driver's driving operation.

According to the above aspect, the target braking force when the drive request is generated by the driving support control is calculated to a value that is larger than the target braking force when the drive request is generated by the driver's driving operation. Therefore, when the drive request is generated by the driving support control, the braking force applied to the vehicle in the process of reducing the braking force can be increased as compared to where the drive request is generated by the driver's driving operation. Thus, when the braking force reduction control is performed during the execution of the driving support control, the possibility of the vehicle slipping down can be effectively reduced.

Further, in another aspect of the present disclosure, the control unit is configured to calculate a target braking force when the driving support control is being performed such that a difference between a target braking force when the drive request is generated by the driving support control and a target braking force when the drive request is generated by the driver's driving operation gradually decreases.

According to the above aspect, a target braking force when the driving support control is being performed is calculated such that a difference between a target braking force when the drive request is generated by the driving support control and a target braking force when the drive request is generated by the driver's driving operation gradually decreases. Therefore, the difference in the target braking forces gradually decreases as a time point is approached at which the magnitude of the required driving force becomes equal to the lowering force estimated by the lowering force estimation device, so that it is possible to reduce the possibility that the braking force when the driving support control is being performed becomes excessive in a situation the above time point is approached.

Further, in another aspect of the present disclosure, the control unit is configured to calculate a target braking force such that a decrease rate of the target braking force when the drive request is generated by the driving support control is smaller than a decrease rate of the target braking force when the drive request is generated by the driver's driving operation.

According to the above aspect, a target braking force is calculated such that a decrease rate of the target braking force when the drive request is generated by the driving support control is smaller than a decrease rate of the target braking force when the drive request is generated by the driver's driving operation. Therefore, a braking force applied to the vehicle in the process of reducing the braking force can be increased and the braking force can be applied to the vehicle for a longer time when the drive request is generated by the driving support control as compared to where the drive request is generated by the driver's driving operation. Thus, it is possible to effectively reduce the possibility that the vehicle may slip down when the braking force reduction control is performed during the execution of the driving support control.

Further, in another aspect of the present disclosure, the control unit is configured to calculate a target braking force such that a target braking force when the drive request is generated by the driving support control is delayed with respect to a target braking force when the drive request is generated by the driver's driving operation.

According to the above aspect, a target braking force is calculated such that a target braking force when the drive request is generated by the driving support control is delayed with respect to a target braking force when the drive request is generated by the driver's driving operation.

Thus, when the drive request is generated by the driving support control, a braking force can be applied to the vehicle longer than when the drive request is generated by the driver's driving operation. Accordingly, it is possible to effectively reduce the possibility that the vehicle may slip down when the braking force reduction control is performed during the execution of the driving support control.

Further, in another aspect of the present disclosure, the control unit is configured to calculate a target braking force which gradually decreases in a preset first pattern when the drive request is generated by the driver's driving operation, calculate a target braking force which gradually decreases in a preset second pattern to be larger than a target braking force calculated in the first pattern when the drive request is generated by the driving support control, and control the braking device such that a braking force applied to the vehicle becomes the target braking force.

According to the above aspect, when the drive request is generated by the driver's driving operation, a target braking force is calculated which gradually decreases in a preset first pattern and when the drive request is generated by the driving support control, a target braking force is calculated which gradually decreases in a preset second pattern to be larger than the target braking force calculated in the first pattern.

Therefore, when the drive request is generated by the driving support control, a braking force applied to the vehicle can be increased as compared to where the drive request is generated by the driver's driving operation. Thus, it is possible to effectively reduce the possibility that the vehicle may slip down when the braking force reduction control is performed during the execution of the driving support control.

Other objects, other features and attendant advantages of the present disclosure will be readily understood from the description of the embodiments of the present disclosure described with reference to the following drawings.

DETAILED DESCRIPTION

The present disclosure will now be described in detail with reference to the accompanying drawings.

First Embodiment

Figure 1:
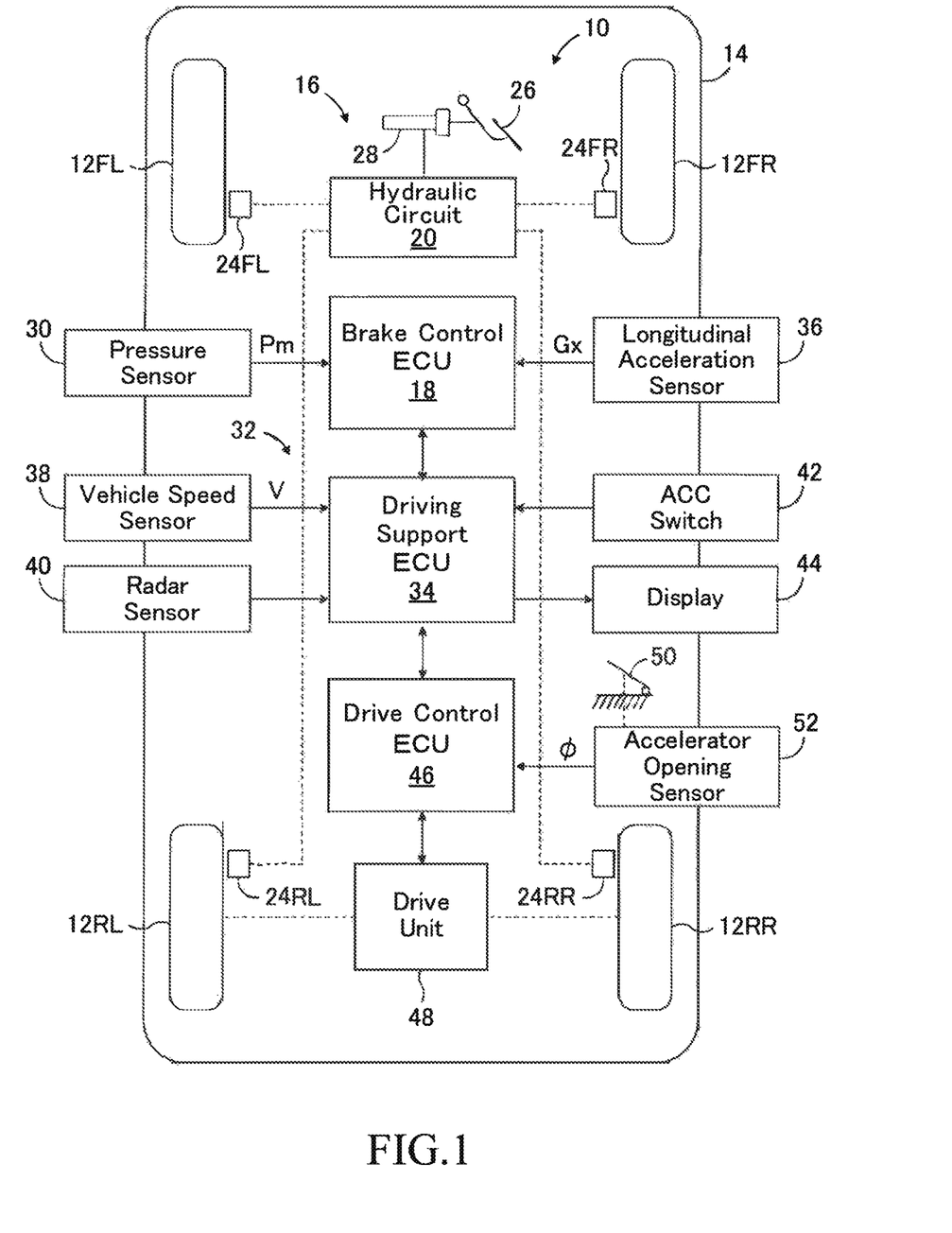
FIG. 1 is a schematic configuration diagram showing a braking force control apparatus for a vehicle according to an embodiment of the present disclosure.

As shown in FIG. 1, the braking force control apparatus 10 according to the embodiments of the present disclosure comprises a braking device 16 that applies braking forces to left and right front wheels 12FL and 12FR and left and right rear wheels 12RL and 12RR, thereby applying a braking force to a vehicle 14 and a brake control electronic control unit 18 for controlling the braking device 16. The left and right front wheels 12FL and 2FR are steered wheels, and although not shown in FIG. 1, they are steered by a steering device in response to steering operation of a steering wheel by a driver. In the following description and FIG. 1, the "electronic control unit" is described as "ECU".

The braking device 16 includes a hydraulic circuit 20 as a brake actuator, and wheel cylinders 24FR, 24FL, 24RR and 24RL provided on the wheels 12FL-12RL, respectively. The braking device 16 applies braking forces to the wheels by controlling pressures in the wheel cylinders 24FR to 24RL by the hydraulic circuit 20, and changes the braking force of the vehicle 14. Although not shown in FIG. 1, the hydraulic circuit 20 includes an oil reservoir, an oil pump, various valve devices, and the like.

As shown in FIG. 1, the braking device 16 has a master cylinder 28 for pumping brake oil in response to a driver's depression operation on a brake pedal 26. Master cylinder 28 is provided with a pressure sensor 30 for detecting a master cylinder pressure Pm, and a signal indicating a master cylinder pressure Pm detected by the pressure sensor 30 is input to the brake control ECU 18.

The brake control ECU 18 controls the braking pressure of each wheel based on a master cylinder pressure Pm, and thereby controls the braking force of each wheel according to a depression operation amount of the brake pedal 26, that is, a braking operation amount of the driver. The braking pressure of each wheel cylinder is individually controlled by the hydraulic circuit 20 being controlled by the brake control ECU 18 as necessary. Therefore, the braking device 16 can individually control the braking force of each wheel regardless of the driver's braking operation.

Further, the brake control ECU 18 controls the braking force of each wheel as needed based on information transmitted from a driving support ECU 34 of a driving support device 32, as will be described in detail later. A signal indicating a longitudinal acceleration Gx of the vehicle 14 detected by a longitudinal acceleration sensor 36 is also input to the brake control ECU 18.

As shown in FIG. 1, a signal indicating a vehicle speed V detected by a vehicle speed sensor 38 and a signal indicating information ahead of the vehicle 14 detected by a radar sensor 40 are input to the driving support ECU 34. Further, a signal indicating information as to whether or not to perform inter-vehicle distance control as driving support control is input to the ECU 34 from an ACC switch 42 operated by the driver, and the ECU 34 displays the inter-vehicle distance control status on a display 44. Notably, the detection of information ahead of the vehicle 14 may be performed by a camera such as a CCD camera, or may be performed by a combination of a radar sensor and a camera.

Although not shown in FIG. 1, the ACC switch 42 includes an inter-vehicle distance control start button, an inter-vehicle distance control end button, an inter-vehicle distance setting button for setting a reference inter-vehicle distance Lc and a vehicle speed setting button for setting a reference vehicle speed Vc. The driving support ECU 34 performs the inter-vehicle distance control in accordance with the settings of these buttons. That is, the ECU 34 starts the inter-vehicle distance control when the inter-vehicle distance control start button is pressed, and ends the inter-vehicle distance control when the inter-vehicle distance control end button is pressed. Although not shown in the drawing, while the inter-vehicle distance control is being performed, the radar sensor 40 emits radio waves in a millimeter wave band to the front of the vehicle 14 and detects reflected waves to get information ahead of the vehicle 14.

When a difference $\Delta V$ (=V−Vc) between a vehicle speed V detected by the vehicle speed sensor 38 and the reference vehicle speed Vc is a positive value, the ECU 34 outputs a braking request to the brake control ECU 18 as necessary such that a magnitude of the vehicle speed difference $\Delta V$ becomes equal to or less than a reference value Va (a positive constant). The ECU 18 controls the braking device 16 such that the braking forces of the wheels 12FL to 12RL increase when the braking request is input.

On the other hand, when the vehicle speed difference $\Delta V$ is a negative value, the ECU 34 outputs an acceleration request to a drive control ECU 46 as necessary such that a magnitude of the vehicle speed difference $\Delta V$ becomes equal to or less than a reference value Vb (a positive constant). When the acceleration request is input, the ECU 46 controls an output of a drive unit 48 such that driving forces of the left and right rear wheels 12RL and 12RR, which are drive wheels, increase (braking force control of constant speed traveling control).

Ii is to be noted that in the illustrated embodiment, the vehicle 14 is a rear wheel drive vehicle, but the vehicle to which the present disclosure is applied may be any of a front wheel drive vehicle, a rear wheel drive vehicle, and a four-wheel drive vehicle. Further, the drive unit 48 may be any drive unit known in the art such as a drive unit including an engine and a gear automatic transmission, a drive unit including an engine and a continuously variable transmission, a hybrid system, a fuel cell system and an electric motor.

Further, the driving support ECU 34 performs inter-vehicle distance control for controlling an inter-vehicle distance between the host vehicle and a preceding vehicle. For example, the ECU 34 determines presence or absence of a preceding vehicle based on the information ahead of the vehicle 14 detected by the radar sensor 40, and when there is a preceding vehicle, estimates a distance L between the host vehicle 14 and the preceding vehicle. When a difference $\Delta L$ (=L−Lc) between the distance L and the reference distance Lc is a positive value exceeding a reference value La (a positive value), the ECU 34 outputs a signal indicating a target acceleration. Gat as an acceleration request to the drive control ECU 46 such that a magnitude of the distance difference $\Delta L$ is equal to or less than the reference value La and equal to or more than a reference value Lb (a negative value). When a signal indicating the target acceleration Gat is input, the ECU 46 calculates a target output torque of the drive unit 48 for achieving the target acceleration Gat, and controls the drive unit such that an output torque of the drive unit becomes the target output torque.

On the other hand, when the distance difference $\Delta L$ is a negative value smaller than the reference value Lb, the driving support ECU 34 outputs a signal indicating the target deceleration Gbt to the brake control ECU 18 as a braking request such that the distance difference $\Delta L$ becomes equal to or larger than the reference value Lb and smaller than or equal to the reference value La. The ECU 18, when the signal indicating the target deceleration Gbt is input, calculates target braking forces of the wheels 12FL to 12RL based on the target deceleration Gbt and controls the braking device 16 so that the braking force of each wheel becomes the corresponding target braking force (braking force control of the inter-vehicle distance control).

The absolute values of the reference value La and the reference value Lb are variably set according to a vehicle speed so as to decrease as the vehicle speed V decreases. Therefore, for example, when the preceding vehicle decelerates and stops, the reference value La gradually decreases, so that the host vehicle decelerates and stops such that a predetermined distance between the host vehicle and the preceding vehicle is secured. Conversely, when the preceding vehicle starts and accelerates in a situation where the host vehicle and the preceding vehicle stop, the host vehicle also starts and accelerates while securing a gradually increasing distance with respect to the preceding vehicle.

In particular, when the vehicle 14 stops and starts moving up on a slope, the driving support ECU 34 cooperates with the brake control ECU 18 to execute the braking force holding control and the braking force reduction control of the hill start assist control. That is, when the vehicle 14 decelerates and stops by braking while the vehicle travels in the uphill direction on a slope and a preset braking force holding condition is satisfied, the brake control ECU 18 executes the braking force holding control that holds the braking force applied to the vehicle. Further, when a drive request for starting the vehicle 14 in the uphill direction on the slope is generated and a signal indicating a target acceleration Gat is output to the drive control ECU 46, a signal indicating the target acceleration Gat is also output to the ECU 18. The ECU 18 estimates a required driving force Fdreq corresponding to the target acceleration Gat, and executes the braking force reduction control that gradually reduces the braking force applied to the vehicle 14 according to the required driving force Fdreq. The braking force reduction control will be described in detail later.

When the braking request is not input, the brake control ECU 18 sets the control mode of the braking device 16 to the normal braking force control mode such that braking forces of the wheels 12FL to 12RL become the braking forces corresponding to the master cylinder pressure Pm. When the acceleration request is not input, the drive control ECU 46 controls the output of the drive unit 48 based on an accelerator opening $\varphi$ detected by an accelerator opening sensor 52 provided on an accelerator pedal 50 and the like. If necessary, refer to, for example, Japanese Patent Application Laid-Open No. 2003-34240 for the above-described inter-vehicle distance control.

The brake control ECU 18, the driving support ECU 34 and the drive control ECU 46 may each include a microcomputer having a CPU, a ROM, a RAM, and an input/output port device, which are connected to each other by a bidirectional common bus. Programs such as the braking control and the inter-vehicle distance control are stored in the ROM of the corresponding microcomputer, and each control is executed by the corresponding CPU according to the program. Further, the ECUs 18, 34 and 46 exchange mutually necessary signals via CAN, not shown in the drawing.

As will be described in detail later, in the first embodiment, the brake control ECU 18 executes the braking force reduction control of the hill start assist control according to the flowchart shown in FIG. 2. Notably, the braking force holding control of the hill start assist control, which is executed when the vehicle 14 stops in the uphill direction on a slope and conditions known in the art are satisfied, may be executed in any manner known in the art.

<Braking Force Reduction Control Routine>

Next, a braking force reduction control routine of the hill start assist control in the first embodiment will be described with reference to the flowchart shown in FIG. 2. The braking force reduction control according to the flowchart shown in FIG. 2 is started when holding of a braking force of the vehicle by the braking force holding control is completed, and is repeatedly executed at predetermined time intervals. In the following description, the braking force reduction control according to the flowchart shown in FIG. 2 is simply referred to as "the control". The same applies to the braking force reduction control routine executed according to the flowchart shown in FIG. 3 in the second embodiment described later.

First, in step 10, a determination is made as to whether or not a reduction of a braking force is completed, for example, by determining whether or not the target braking force Fbt calculated in the previous step 70 or 90 described later is equal to or less than a control end reference value Fbt0 (a positive constant). When an affirmative determination is made, the braking force reduction control is finished, and when a negative determination is made, the control proceeds to step 20.

In step 20, a determination is made as to whether or not the braking force is being reduced by the reduction of the target braking force Fbt. When an affirmative determination is made, the control proceeds to step 50, and when a negative determination is made, the control proceeds to step 30.

In step 30, a determination is made as to whether or not a drive request for driving the vehicle 14 to travel the vehicle is generated. When an affirmative determination is made, the control proceeds to step 50, and when a negative determination is made, the control proceeds to step 40. Although not shown in FIG. 2, when the control proceeds to step 50, for example, a lowering force Fdown which causes the vehicle to descend along a slope due to the gravity is estimated based on a longitudinal acceleration Gx of the vehicle 14 and is stored in the RAM. Thus, the step 30 and the longitudinal acceleration sensor 36 function as a lowering force estimation device that estimates a lowering force that causes the vehicle to descend along the slope due to the gravity. The lowering force Fdown may be estimated based on an inclination angle of the slope and a mass of the vehicle 14, and an inclination angle of the slope may be detected or estimated based on information from a navigation device.

When a control for starting and running the vehicle is performed by the inter-vehicle distance control, it is determined that a drive request is generated by the inter-vehicle distance control. When the driver performs a shift operation from P or N range to D range or when an accelerator opening φ increases from 0, t is determined that a drive request by the driver's driving operation has been issued. Further, when the shift position is in the D range or when an accelerator opening φ is a positive value, it is determined that a drive request by the driver's driving operation is generated.

In step 40, the braking force holding control is continued bye holding the braking forces applied to the wheels 12FL-12RL by the braking device 16. Thus, the vehicle 14 is prevented from sliding down along the slope due to the gravity.

In step 50, a determination is made as to whether or not the drive request is generated by the inter-vehicle distance control. When a negative determination is made, that is, when it is determined that the drive request is generated by the driver's driving operation, the control proceeds to step 80, and when an affirmative determination is made, the control proceeds to step 60.

In step 60, a required driving force Fdreq corresponding to a target acceleration Gat is estimated, for example, as a product of the target acceleration Gat and a mass (a positive constant) of the vehicle 14. The required driving force Fdreq is positive when t is a driving force in the acceleration direction of the vehicle 14. Thus, step 60 and the drive control ECU 46 function as a required driving force estimation device for estimating a required driving force of the drive request. The required driving force Fdreq may be estimated based on an accelerator opening φ, a driving torque of the drive unit 48 and the like.

In step 70, a target braking force Fbt of the vehicle 14 is calculated according to the following equation (1). Notably, the lowering force Fdown is positive when it is a force acting in the downhill direction, and the target braking force Fbt is positive when it is a force acting in the deceleration direction of the vehicle 14. ΔFbt is an increase correction amount (a positive constant) of the braking force.

$$Fbt = Fdown - Fdreq + \Delta Fbt \quad (1)$$

In step 80, a required driving force Fdreq is estimated based on an accelerator opening φ detected by the accelerator opening sensor 52 so as to increase as the accelerator opening φ increases. Thus, step 80 and the accelerator opening sensor 52 function as a required driving force estimation device for estimating a required driving force of the drive request Also in this step, the required driving force Fdreq may be estimated based on a depression amount of the accelerator pedal 50, a driving torque of the drive unit 48, and the like.

In step 90, a target braking force Fbt of the vehicle 14 is calculated according to the following equation (2).

$$Fbt = Fdown - Fdreq \quad (2)$$

When the above step 70 or 90 is completed, the control proceeds to step 100. In step 100, target braking forces Fbtfl, Fbtfr, Fbtrl and Fbtrr of the front wheels 12FL and 12FR and the rear wheels 12RL and 12RR, respectively are calculated based on the target braking force Fbt and a front/rear wheel distribution ratio of the braking force. Further, control of the braking forces is performed by controlling the braking device 16 so that braking forces of the respective wheels become the corresponding target braking forces. Therefore, a braking force Fb of the vehicle 14 is gradually reduced as the required driving force Fdreq increases until the reduction of the braking force is completed and an affirmative determination is made in step 10.

<Operation of First Embodiment>

As understood from the above description, when a drive request for driving the vehicle 14 to travel the vehicle is generated during the braking force holding control, an affirmative determination is made in step 30, and the steps after step 50 are performed, thereby the braking force reduction control is performed. When a drive request is generated by the inter-vehicle distance control (hereinafter referred to as "in the case of inter-vehicle distance control"), an affirmative determination is made in step 50, so that a target braking force Fbt of the vehicle 14 is calculated in steps 60 and 70. On the other hand, when a drive request is generated by the driver's driving operation (hereinafter referred to as "in the case of the driver's driving operation"), a negative determination is made in step 50, so that a target braking force Fbt of the vehicle 14 is calculated in steps 80 and 90. In both cases, in step 100, a braking force Fb of the vehicle 14 is gradually reduced by being controlled to become the target braking force Fbt.

The target braking force Fbt of the vehicle 14 is calculated in, step 70 according to the equation (1) and in step 90 according to equation (2). Therefore, comparing the cases of inter-vehicle distance control and driver's driving operation where the lowering force Fdown and the required driving force Fdreq are the same, the target braking force Fbt in the case of the inter-vehicle distance control is larger by the increase correction amount ΔFbt than the target braking force Fbt in the case of the driver's driving operation.

Figure 4:
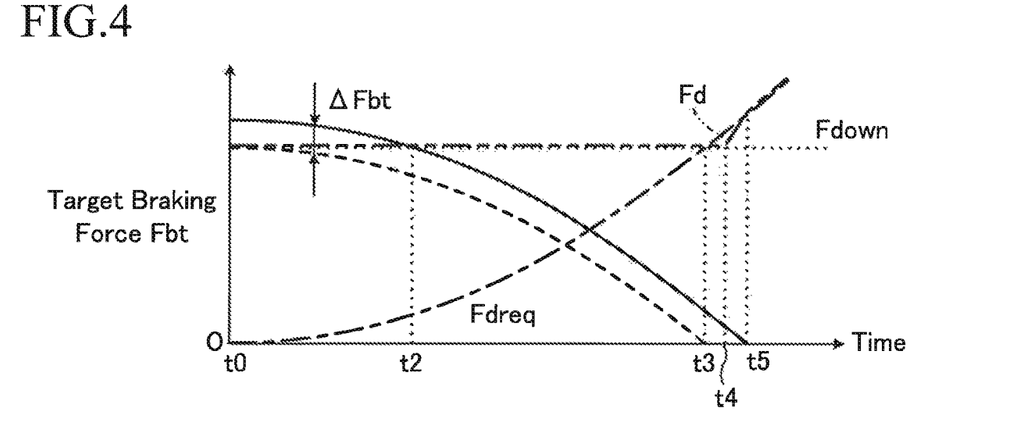
FIG. 4 is a time chart showing a change of a target braking force Fbt with respect to a change of a required driving force Fdreq in the first embodiment.

For example, FIG. 4 is a time chart showing a change of a target braking force Fbt with respect to a change of a required driving force Fdreq in the first embodiment. In FIG. 4, the solid line and the broken line indicate target braking forces Fbt in the case of inter-vehicle distance control and in the case of the driver's driving operation, respectively, and the one dot chain line indicates a required driving force Fdreq. Further, the two-dot chain line indicates a change of the driving force Fd of the vehicle in the case of the inter-vehicle distance control with the value of the lowering force Fdown being assumed to be zero. The same applies to FIGS. 5 to 7 described later.

As shown in FIG. 4, the required driving force Fdreq changes in the same manner in both cases of the inter-vehicle distance control and the driver's driving operation. A drive request is generated at time point t0, and it is assumed that the target braking force Fbt in the case of the inter-vehicle distance control becomes equal to the lowering force Fdown at time point t2. Further, it is assumed that the target braking force Fbt in the case of the driver's driving operation becomes 0 at time point t3 and the target braking force Fbt in the case of the inter-vehicle distance control becomes 0 at time point t5. Notably, although in the section from time point t0 to time point t2, the target braking force Fbt in the case of the inter-vehicle distance control is shown to be larger than the lowering force Fdown, a braking force Fb actually generated does not exceed the lowering force Fdown, so that it is Fdown.

In the case of the driver's driving operation, the target braking force Fbt becomes 0 at time point t3 when the required driving force Fdreq becomes equal to the lowering force Fdown, and after time point t3, the driving force Fd of the vehicle becomes a positive value and gradually increases. Therefore, compared with the case where the target braking force Fbt becomes zero at a time point other than the time point t3, it is possible to reduce the possibility that the vehicle 14 may slip down along the slope due to the gravity, and the driver feels a sense of getting stuck due to excessive braking force.

On the other hand, in the case of the inter-vehicle distance control, the target braking force Fbt at time point t3 is not zero but ΔFbt. Thus, the driving force Fd of the vehicle is zero until time point t4 between time point t3 and time point t5, and after time point t4, the driving force Fd of the vehicle becomes a positive value and gradually increases. Therefore, the risk of the vehicle 14 sliding down along the slope due to the gravity can be effectively reduced. Since start of the vehicle is not caused by the driver's driving operation, even if the start of the vehicle is delayed, the driver does not feel a sense of getting stuck.

In the first embodiment and the fifth embodiment described later, the increase correction amount ΔFbt of the braking force is a positive constant. However, a distance by which the vehicle 14 slides down along a slope due to the braking force becoming zero early is larger as an inclination angle of the slope is larger and hence an absolute value of a longitudinal acceleration Gx of the vehicle is larger. Therefore, the increase correction amount ΔFbt may be variably set according to an absolute value of a longitudinal acceleration Gx such that the increase correction amount ΔFbt increases as the absolute value of the longitudinal acceleration Gx of the vehicle increases. According to this modification, regardless of a magnitude of an inclination angle of a slope, it is possible to effectively reduce the risk of the vehicle 14 sliding down along the slope while reducing the possibility that start of the vehicle is delayed excessively due to excessive braking force.

Second Embodiment

Figure 2:
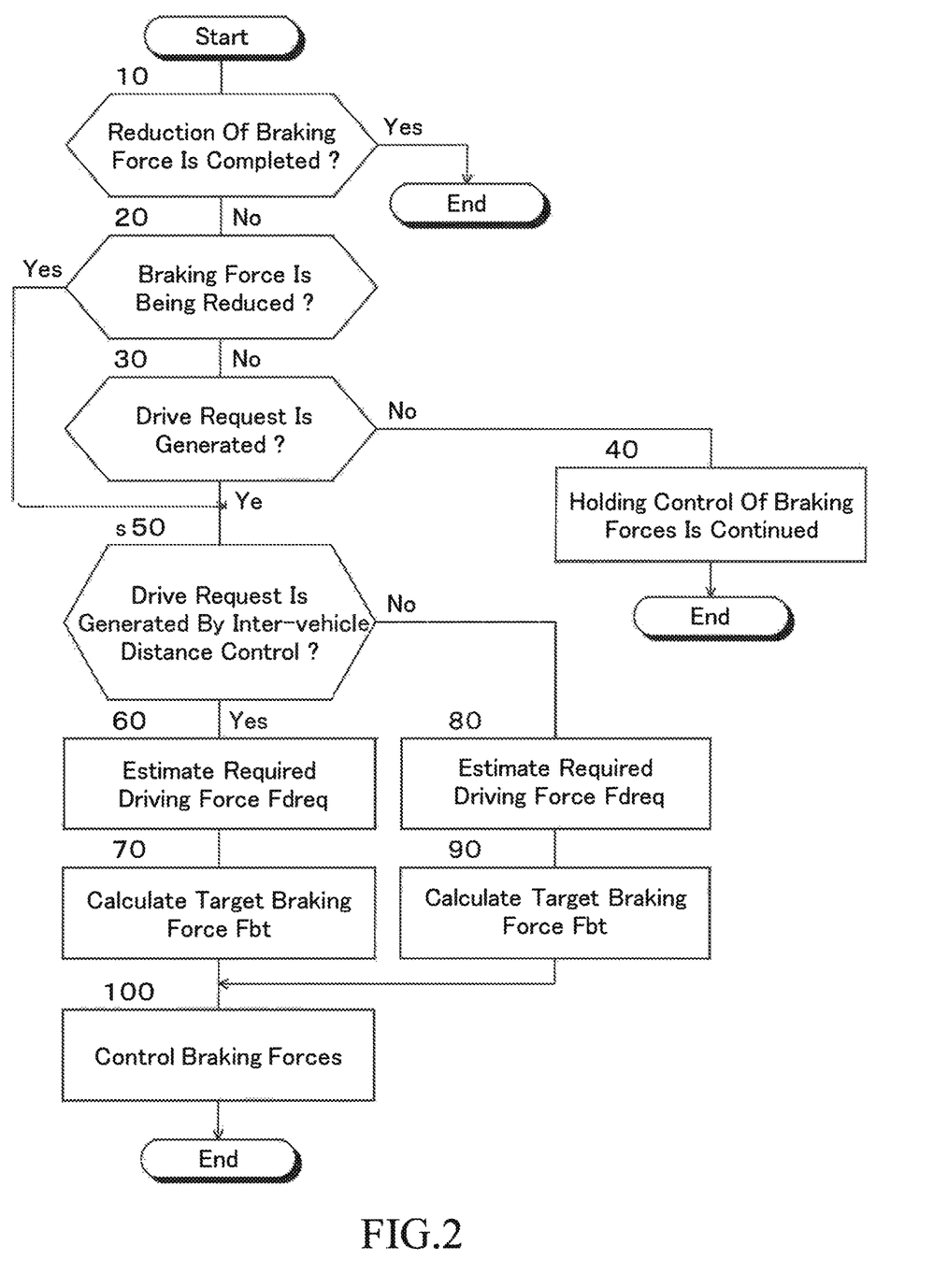
FIG. 2 is a flowchart showing a braking force reduction control routine of the hill start assist control in the first to fourth embodiments.

In the second embodiment, the steps other than step 70 of the flowchart shown in FIG. 2 are performed in the same manner as in the first embodiment, whereby the braking force reduction control of the hill start assist control is performed.

In step 70 of the second embodiment, for example, assuming that a difference Fdreq−Fdreq(−1) between a present required driving force Fdreq and a required driving force Fdreq(−1) stored one cycle before is ΔFdreq, and K2 is a positive constant coefficient smaller than 1, a target braking force Fbt of the vehicle 14 is calculated according to the following equation (3). Notably, in the calculation of the target braking force Fbt immediately after a required driving force is generated by the inter-vehicle distance control, the difference ΔFdreq is set to zero because there is no required driving force Fdreq(−1).

$$Fbt=Fdown-Fdreq+K2\Delta Fdreq \tag{3}$$

Figure 5:
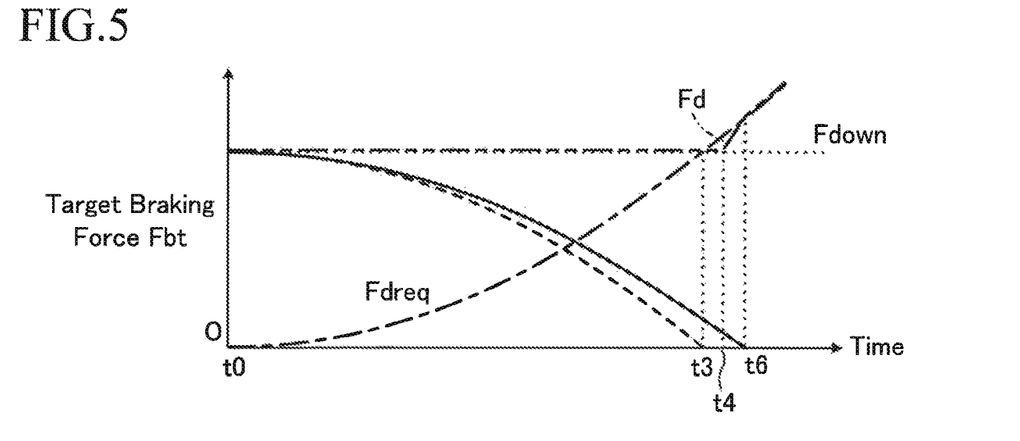
FIG. 5 is a time chart showing a change of a target braking force Fbt with respect to a change of a required driving force Fdreq in the second embodiment.

FIG. 5 is a time chart similar to FIG. 4 showing a change of the target braking force Fbt with respect to a change of a required driving force Fdreq in the second embodiment. As understood from the comparison between the solid line and the broken line in FIG. 5, the decreasing change of the target braking fore Fbt in the case of the inter-vehicle distance control is gentler than in the case of the driver's driving operation. The target braking force Fbt in the case of the inter-vehicle distance control is a positive value at time point t3 and becomes zero at time point t6 delayed from time point t3. Therefore, as in the first embodiment, the driving force Fd of the vehicle is zero until time point t4 between time point t3 and time point t6 and after time point t4, the driving force Fd of the vehicle becomes a positive value and increases gradually.

In the second embodiment described above, the coefficient K2 is a positive constant. However, a distance by which the vehicle 14 slides down along a slope due to the braking force becoming zero early is larger as an inclination angle of the slope is larger and hence an absolute value of a longitudinal acceleration Gx of the vehicle is larger. Therefore, the coefficient K2 may be variably set according to an absolute value of a longitudinal acceleration Gx of the vehicle such that the coefficient K2 increases as the absolute value of the longitudinal acceleration Gx increases. According to this modification, regardless of a magnitude of an inclination angle of a slope, it is possible to effectively reduce the risk of the vehicle 14 sliding down along the slope while reducing the possibility that start of the vehicle is delayed excessively due to excessive braking force.

Third Embodiment

In the third embodiment, steps other than steps 60 and 70 of the flowchart shown in FIG. 2 are performed in the same manner as in the first embodiment, whereby the braking force reduction control of the hill start assist control is performed.

In step 60 of the third embodiment, as in step 60 of the first embodiment, a required driving force Fdreq corresponding to a target acceleration Gat is estimated, but the required driving force Fdreq is stored in the RAM.

In step 70, based on a required driving force Fdreq(−n) (a required driving force stored n cycles before) stored in the RAM before a preset delay time Δt (a positive constant), a target braking force Fbt of the vehicle 14 is calculated according to the following equation (4). Notably, the required driving force Fdreq(−n) is set to zero in a section before the delay time Δt elapses after the required driving force is generated. When the calculation of the target braking force Fbt is completed, the information of the required driving force Fdreq(−n) utilized in the calculation is cleared from the RAM.

$$Fbt=Fdown-Fdreq(-n) \tag{4}$$

Figure 6:
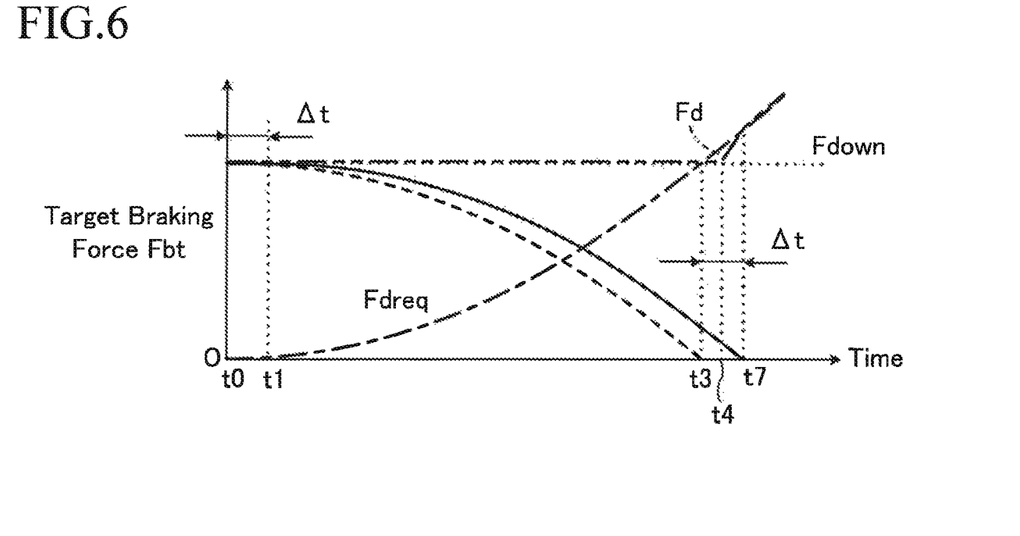
FIG. 6 is a time chart showing a change of a target braking force Fbt with respect to a change of a required driving force Fdreq in the third embodiment.

FIG. 6 is a time chart similar to FIG. 4 showing a change of a target braking force Fbt with respect to a change of a required driving force Fdreq in the third embodiment. In the case of the inter-vehicle distance control, as indicated by the solid line in FIG. 6, before the time point t1 when the delay time Δt passes from the time point t0 when the drive request is generated, the required driving force Fdreq(−n) is set to zero. Therefore, before the time point t1 the target braking force Fbt is calculated to the lowering force Fdown, so the target braking force Fbt is a constant value of the lowering force Fdown, and the target braking force Fbt is reduced after the time point t1.

Accordingly, the target braking force Fbt in the case of the inter-vehicle distance control is a value delayed by the delay time Δt from the target braking force Fbt in the case of the driver's driving operation. The target braking force Fbt in the case of the inter-vehicle distance control is a positive value at time point t3 and becomes zero at time point t7 delayed from time point t3 by the delay time Δt. Thus, as in the first and second embodiments, the driving force Fd of the vehicle is zero until time point t4 between time points t3 and t7, and when time point t4 is passed, the driving force Fd of the vehicle becomes positive and gradually increases.

In the third embodiment and the seventh embodiment described later, the delay time Δt is a positive constant. However, a distance by which the vehicle 14 slides down along a slope due to the braking force becoming zero early is larger as an inclination angle of the slope is larger and hence an absolute value of a longitudinal acceleration Gx of the vehicle is larger. Therefore, the delay time Δt may be variably set according to an absolute value of a longitudinal acceleration Gx such that the delay time Δt increases as the absolute value of the longitudinal acceleration Gx of the vehicle increases. According to this modification, regardless of a magnitude of an inclination angle of a slope, it is possible to effectively reduce the risk of the vehicle 14 sliding down along the slope while reducing the possibility that start of the vehicle is delayed excessively due to excessive braking force.

As understood from the above descriptions, according to the first to third embodiments, it is possible to gradually reduce the target braking force Fbt in accordance with an increase of a required driving force Fdreq. In particular, in the case of the inter-vehicle distance control, it is possible to effectively reduce the possibility of the vehicle 14 sliding down along a slope while avoiding the possibility that a driver may feel a sense of getting stuck from being increased when the driver performs a driving operation. Since start of the vehicle is not caused by driver's driving operation, even if the start of the vehicle is delayed, the driver does not feel a sense of getting stuck.

Further, according to the first to third embodiments, the target braking force Fbt in the case of the driver's driving operation is not influenced by the setting of the target braking force Fbt in the case of the inter-vehicle distance control. That is, the target braking force Fbt becomes zero at time point t3 when the required driving force Fdreq becomes equal to the lowering force Fdown. Therefore, in the case of the driver's driving operation, it is possible to reduce the possibilities that the vehicle 14 may slide down along the slope due to the gravity and the driver may feel a sense of getting stuck without being affected by the setting of the target braking force Fbt in the case of the inter-vehicle distance control.

Furthermore, according to the first and second embodiments, the target braking force Fbt after time point t0 in the case of the inter-vehicle distance control is larger than the target braking force Fbt in the case of the driver's driving operation. According to the third embodiment, the target braking force Fbt after time point t1 in the case of the inter-vehicle distance control is larger than the target braking force Fbt in the case of the driver's driving operation.

Therefore, in a situation where the braking force becomes lower than the target braking force Fbt due to a decrease in a gain of the braking force control or a variation in a friction coefficient of the braking force generators of the braking device 16, it is possible to reduce the possibility of the vehicle 14 sliding down along a slope due to a lack of the braking force.

Fourth Embodiment

In the fourth embodiment, steps other than step 70 of the flowchart own in FIG. 2 are performed in the same manner as in the first embodiment, whereby the braking force reduction control of the hill start assist control is performed.

In step 70 of the fourth embodiment, for example, a target braking force Fbt of the vehicle 14 is calculated according to the following equation (5), where a difference Fdown−Fdreq between the lowering force Fdown and the required driving force Fdreq is ΔFd and K4 is a positive constant coefficient smaller than 1. As understood from the comparison between the equations (5) and (2), the target braking force Fbt in the case of the inter-vehicle distance control is larger by an increase correction amount K4ΔFbtΔFd than the target braking force Fbt in the case of the driver's driving operation, and the increase correction amount K4ΔFbtΔFd becomes gradually smaller. Here, ΔFbt is an increase correction amount (a positive constant) of the braking force, as with ΔFbt in the first embodiment.

$$Fbt=Fdown-Fdreq+K4\Delta Fbt\Delta Fd \tag{5}$$

Figure 7:
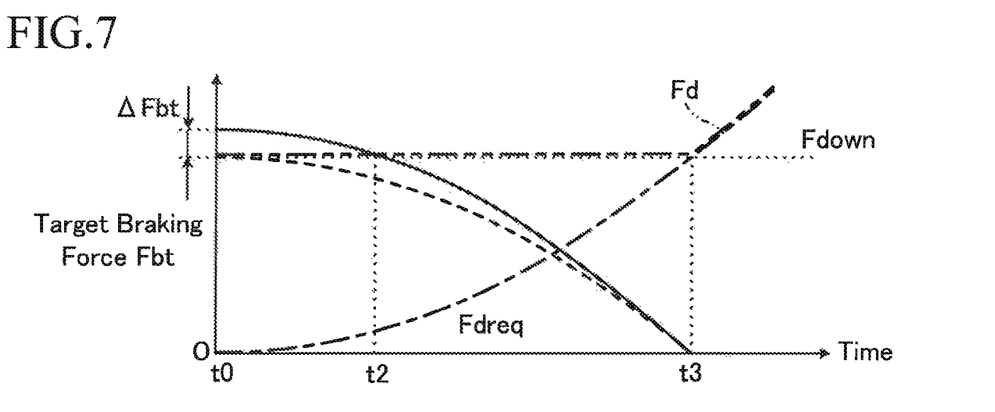
FIG. 7 is a time chart showing a change of a target braking force Fbt with respect to a change of a required driving force Fdreq in the fourth embodiment.

FIG. 7 is a time chart similar to FIG. 4 showing a change of the target braking force Fbt with respect to a change of a required driving force Fdreq in the fourth embodiment. As understood from the comparison between the solid line and the broken line in FIG. 7, the target braking force Fbt in the case of the inter-vehicle distance control is larger than the target brain force Fbt in the case of the driver's driving operation, and their difference gradually decreases and becomes zero at time point t3. Thus, the driving force Fd of the vehicle is zero from time point t0 to time point t3 and becomes a positive value and gradually increases after time point t3. As in the first embodiment, since the braking force Fb actually generated does not exceed the lowering force Fdown even in a section where the target braking force Fbt in the case of the inter-vehicle distance control is larger than the lowering force Fdown, it is Fdown.

For example, consider a situation where a control gain of the braking force control is reduced to 90 with respect to the normal value 100 in the case of the inter-vehicle distance control. Assuming that the lowering force Fdown is 100N, the braking force Fbreq (not shown) required to maintain the vehicle in the stopped state is 100N at time point t0. However, an actual braking force Fb at time point t0 is 90N due to the decrease of the control gain, the vehicle 14 slips down along a slope due to the insufficient braking force.

According to the fourth embodiment, the target braking force Fbt the case of the inter-vehicle distance control is larger than the target braking force Fbt in the case of the driver's driving operation by the increase correction amount K4ΔFbtΔFd, and an actual braking force Fb at time point t0 is larger than 90N, so that it is possible to reduce the possibility that the vehicle 14 may slide down along a slope due to an insufficient braking force.

Further, the braking force Fbreq required to maintain the vehicle in the stopped state gradually decreases as the required driving force Fdreq increases. For example, when the braking force Fbreq lowers to 10N, the value with which the actual braking force Fb runs short due to the reduction of the control gain is 1N. That is, the increase correction amount of the braking force necessary to compensate for the shortage of the actual braking force Fb also gradually decreases as the required driving force Fdreq increases.

According to the fourth embodiment, the increase correction amount K4ΔFbtΔFd gradually decreases as the required driving force Fdreq increases. Therefore, in the case of the inter-vehicle distance control, it is possible to reduce the possibility that the start of the vehicle may be delayed excessively due to the increase correction amount of the braking force being excessive, while reducing the possibility of the vehicle 14 sliding down along the slope, due to the lack of the braking force.

In particular, according to the fourth embodiment, the increase correction amount K4ΔFbtΔFd becomes zero at time point t3 at which the required driving force Fdreq becomes equal to the lowering force Fdown. Therefore, it is possible to reduce the possibility that the start of the vehicle may be delayed excessively as compared to a case where the increase correction amount at time point t3 is a positive value.

In the fourth embodiment described above, the coefficient K4 is a positive constant. However, a distance by which the vehicle 14 slides down along a slope due to the lack of the braking force increases as an inclination angle of the slope increases, and hence an absolute value of a longitudinal acceleration Gx of the vehicle increases. Therefore, the coefficient K4 may be variably set in accordance with an absolute value of a longitudinal acceleration Gx such that the coefficient K4 increases in the range less than 1 as the absolute value of the longitudinal acceleration Gx of the vehicle increases. According to this modification, regardless of a magnitude of an inclination angle of a slope, it is possible to effectively reduce the risk of the vehicle 14 sliding down along the slope while reducing the possibility that start of the vehicle is delayed excessively due to excessive braking force.

Fifth Embodiment

In the fifth embodiment and the sixth and seventh embodiments described later, the required driving force Fdreq is estimated in neither of the cases of the inter-vehicle distance control nor the driver's driving operation, and the target braking force Fbt in each case is controlled to decrease in a preset decrease pattern. Therefore, in these embodiments, the braking force reduction control of the hill start assist control is performed according to the flowchart shown in FIG. 3.

Figure 3:
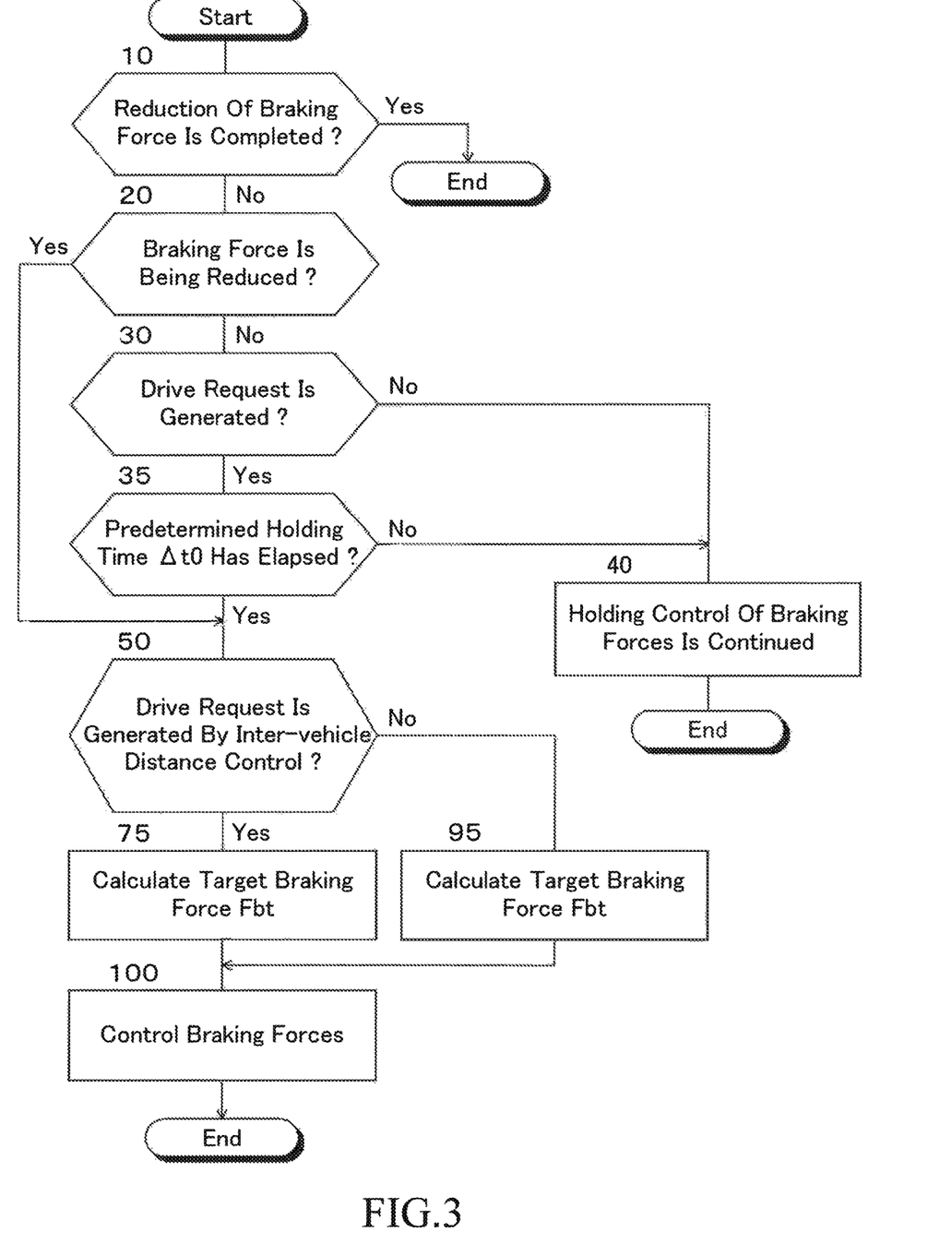
FIG. 3 is a flowchart showing a braking force reduction control routine of the hill start assist control in the fifth to seventh embodiments.

As can be understood from the comparison between FIGS. 3 and 2, in the fifth to seventh embodiments steps 10 to 50 and step 100 are performed similarly to the first to fourth embodiments, but when a positive determination is made in step 30, step 35 is executed. In step 35, a determination is made as to whether or not a predetermined holding time Δt0 (a positive constant) set in advance has elapsed from the time when the drive request is generated. When a negative determination is made, the control proceeds to step 40, and when an affirmative determination is made, the control proceeds to step 50. Thus, the braking force applied to the vehicle is held until the predetermined holding time Δt0 elapses.

Furthermore, in the fifth to seventh embodiments, steps 60 and 80 in the first to fourth embodiments are not performed. When an affirmative determination is made in step 50, that is, when it is determined that the drive request is generated by the inter-vehicle distance control, the control proceeds to step 75, and when a negative determination is made, the control proceeds to step 95.

In particular, in step 75 of the fifth embodiment, the target braking force Foot of the vehicle 14 is calculated according to the following equation (6). In the equation (6) below and the equation (7) described later, Fbtf is a target braking force Fbt calculated in the previous cycle, and ΔFbdec is a reduction amount (a positive constant) of the braking force for each cycle. When step 75 is executed for the first time, Fbtf is set to the braking force (the same as the lowering force down) which has been held so far. Further, in the following equation (6), ΔFbt is an increase correction amount (a positive constant) of the braking force as in the first embodiment.

$$Fbt = Fbtf - \Delta Fbdec + \Delta Fbt \qquad (6)$$

On the other hand, in step 95 of the fifth embodiment, the target braking force Fbt of the vehicle 14 is calculated according to the following equation (7). Notably, the target braking force Fbt is also calculated according to the equation (7) in steps 95 of the sixth to seventh embodiments described later.

$$Fbt = Fbtf - \Delta Fbdec \qquad (7)$$

Thus, when the predetermined holding time Δt0 has elapsed, the target braking force Fbt of the vehicle 14 is reduced in the first pattern by being calculated according to the equation (7) in the case of the driver's driving operation, and it is reduced in the second pattern by being calculated according to equation (6) in the case of the inter-vehicle distance control. Therefore, comparing with the cases where the lowering force Fdown is the same, the target braking force Fbt in the case of the inter-vehicle distance control is larger by the increase correction amount ΔFbt than the target braking force Fbt in the case of the driver's driving operation, and the target braking force Fbt in both the case decreases by ΔFbdec every cycle.

Figure 8:
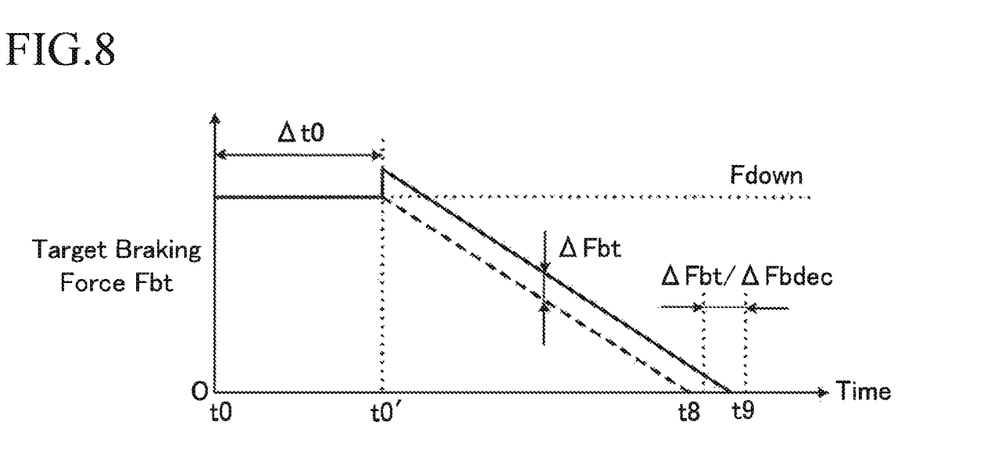
FIG. 8 is a time chart showing a change of a target braking Force Fbt in the fifth embodiment.

FIG. 8 is a time chart showing changes of the target braking force Fbt in the fifth embodiment in the cases of the driver's driving operation and the inter-vehicle distance control. As shown in FIG. 8, the reduction of the target braking force Fbt is started at time point t0' when a predetermined holding time Δt0 elapses from time point t0 at which the drive request is generated.

The target braking force Fbt in the case of the inter-vehicle distance control indicated by the solid line is also a positive value at time point t8 when the target braking force Fbt in the case of the driver's driving operation indicated by the broken line becomes zero and it becomes zero at time point t9 which is ΔFbt/ΔFbdec later than time point t8. As in the first embodiment, the braking force Fb actually generated does not exceed the lowering force Fdown even in a section where the target braking force Fbt in the case of the inter-vehicle distance control is larger than the lowering force Fdown so that it is Fdown.

Therefore, in the case of the inter-vehicle distance control, as compared with the case of the driver's driving operation, the target braking force Fbt can be increased to increase the braking force Fb applied to the vehicle and the braking force Fb can be applied to the vehicle for a longer time.

Sixth Embodiment

In step 75 of the sixth embodiment, the target braking force Fbt of the vehicle 14 is calculated according to the following equation (8), where K6 is a positive constant coefficient smaller than 1.

$$Fbt=Fbtf-K6\Delta Fbdec \quad (8)$$

Thus, when the predetermined holding time Δt0 has elapsed, the target braking force Fbt of the vehicle 14 is reduced in the first pattern by being calculated according to the equation (7) in the case of the driver's driving operation, and it is reduced in the third pattern by being calculated according to equation (8) in the case of the inter-vehicle distance control. The decrease rate of the target braking force Fbt of the third pattern is smaller than the decrease rate of the target braking force Fbt of the first pattern. Therefore, comparing with the oases where the lowering force Fdown is the same, the target braking force Fbt in the case of the inter-vehicle distance control is larger than the target braking force Fbt in the case of the driver's driving operation, and a difference between them gradually increase with the passage of time.

Figure 9:
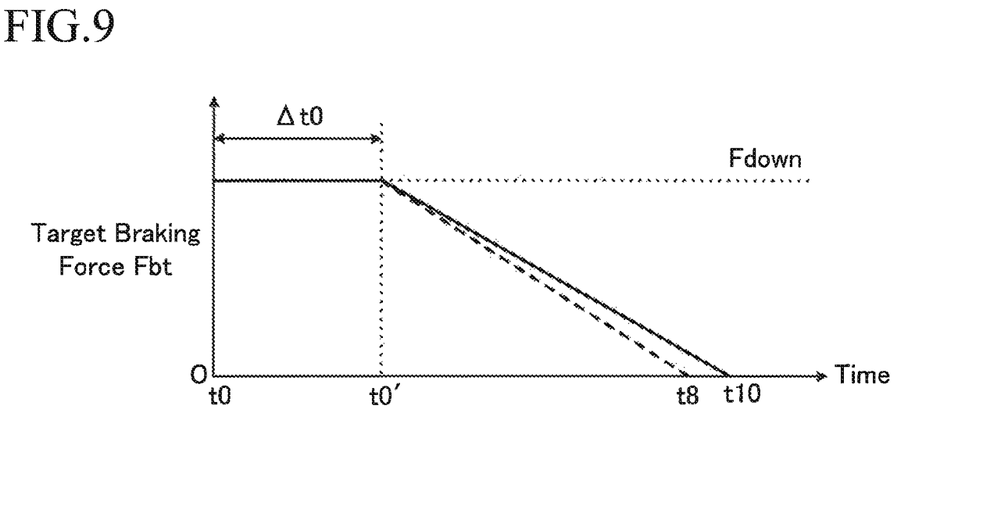
FIG. 9 is a time chart showing a change of a target braking force Fbt in the sixth embodiment.

FIG. 9 is a time chart similar to FIG. 8 showing changes in the target braking force Fbt in the cases of the driver's driving operation and the inter-vehicle distance control. As shown in FIG. 9, in both the cases of the driver's driving operation and the inter-vehicle distance control, the reduction of the target braking force Fbt is started at time point t0' when the predetermined holding time Δt0 has elapsed. The target braking force Fbt in the case of the inter-vehicle distance control indicated by the solid line decreases more slowly than the target braking force Fbt in the case of the driver's driving operation indicated by the broken line, and is still a positive value at time point t8 when the latter target braking force Fbt becomes zero, and becomes zero at time point t10 later than time point t8.

Therefore, after the predetermined holding time Δt0 has elapsed from the time point when the required driving force is generated, in the case of the inter-vehicle distance control, the target braking force Fbt can be made larger than in the case of the driver's driving operation to increase the braking force Fb applied to the vehicle, and the braking force Fb can be applied to the vehicle for a longer time.

In the sixth embodiment described above, the coefficient K6 is a positive constant. However, the coefficient K6 may be variably set according to an absolute value of a longitudinal acceleration Gx such that the coefficient K6 decreases in the range less than 1 as the absolute value of the longitudinal acceleration Gx of the vehicle increases, contrary to the coefficient K2 in the second embodiment described above. According to this modification, regardless of a magnitude of an inclination angle of a slope, it is possible to effectively reduce the risk of the vehicle 14 sliding down along the slope while reducing the possibility that start of the vehicle is delayed excessively due to excessive braking force.

Seventh Embodiment

In step 75 of the seventh embodiment, before a predetermined delay time Δt (a positive constant) elapses from time point t0', the target braking force Fbt of the vehicle 14 is set to the braking force (the same as the lowering force Fdown held until then. The target braking force Fbt is calculated according to the above equation (7) after time point t0" where the predetermined delay time Δt elapses from time point t0'.

Accordingly, while in the case of the driver's driving operation, the target braking force Fbt of the vehicle 14 decreases from the time point when the predetermined holding time Δt0 has elapsed, in the case of the inter-vehicle distance control, the decrease is started with a delay time Δt after the predetermined holding time Δt0 has elapsed. Therefore, comparing with the cases where the lowering force Fdown is the same, after the delay time Δt has elapsed from the time point when the predetermined holding time Δt0 has elapsed, the target braking force Fbt in the case of the inter-vehicle distance control is larger by ΔFbdecΔt than the target braking force Fbt in the case of the driver's driving operation.

Figure 10:
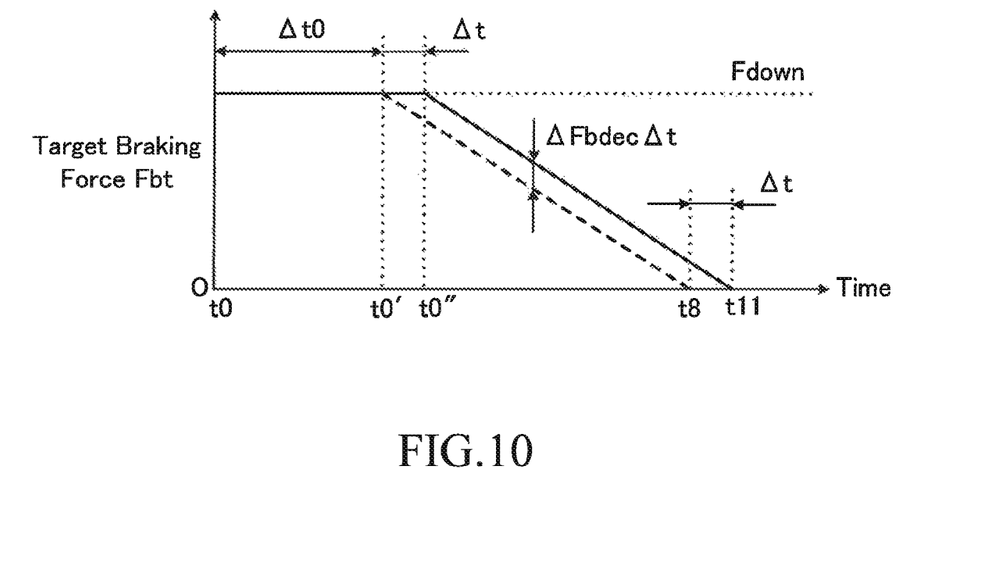
FIG. 10 is a time chart showing a change of a target braking force Fbt in the seventh embodiment.

FIG. 10 is a time chart similar to FIG. 8 showing changes in the target braking force Fbt in the cases of the driver s driving operation and the inter-vehicle distance control. As shown in FIG. 10, the target braking force Fbt in the case of the inter-vehicle distance control indicated by the solid line is still a positive value at time point t8 when the target braking force Fbt in the case of the driver's driving operation indicated by the broken line becomes zero, and becomes zero at time point t11 later than the time point t8 by the delay time Δt.

Therefore, in the case of the inter-vehicle distance control, the holding time of the braking force can be increased by Δt as compared with the case of the driver's driving operation. Further, after the delay time Δt has elapsed from the time point when the predetermined holding time Δt0 has elapsed, the target braking force Fbt can be increased to increase the braking force Fb applied to the vehicle and the braking force Fb can be applied to the vehicle for a longer time.

As understood from the above descriptions, according to the fifth to seventh embodiments, in the case of the inter-vehicle distance control, it is possible to effectively reduce the possibility of the vehicle 14 sliding down along a slope while reducing the possibility that the driver feels a sense of getting stuck when the driver performs a driving operation. Since start of the vehicle is not caused by driver's driving operation, even if the start of the vehicle is delayed, the driver does not feel a sense of getting stuck.

Further, according to the fifth to seventh embodiments, the target braking force Fbt after time point t0' in the case of the inter-vehicle distance control is larger than the target braking force Fbt in the case of the driver's driving operation. Therefore, in a situation where the braking force becomes lower than the target braking force Fbt due to a decrease in a gain of the braking force control or a variation in a friction coefficient of the braking force generators of the braking device 16, it is possible to reduce the possibility of the vehicle 14 sliding down along a slope due to a lack of the braking force.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described embodiments, the driving support control is inter-vehicle distance control in all vehicle speed range. However, the driving support control may be any driving support control that automatically controls and drives the vehicle without requiring a driver's control and driving operation, as in automatic driving control.

For example, in the first to fourth embodiments, a required driving force Fdreq is estimated, and a target braking force Fbt of the vehicle 14 is calculated based on the required driving force Fdreq, whereby a braking force Fb of the vehicle is gradually reduced according to the required driving force Fdreq. However, a target decreasing gradient of the braking force Fb of the vehicle 14 may be calculated based on the required driving force Fdreq and controlled so that a decreasing gradient of the braking force Fb becomes the target decreasing gradient, whereby the braking force Fb of the vehicle may be gradually reduced.

In modifications of the first and third embodiments, the braking force Fb of the vehicle is reduced from Fdown+ΔFbt at the target decrease gradient. In a modification of the second embodiment, a target decrease gradient is calculated based on the required driving force Fdreq so that the target decrease gradient is smaller in the case of the driving assistance control than in the case of the driver's driving operation.

Further, in the fifth to seventh embodiments, in both the cases of the driving support control and the driver's driving operation, the target braking force Fbt is linearly reduced by being reduced by the constant reduction amount ΔFbdec every cycle. However, the reduction amount ΔFbdec may be variably set according to an absolute value of a longitudinal acceleration Gx so as to decrease as an absolute value of a longitudinal acceleration Gx of the vehicle increases. According to this modification, compared to the case where the reduction amount ΔFbdec is constant, regardless of the magnitude of an inclination angle of a slope, it is possible to more effectively reduce the risk of the vehicle 14 sliding down along the slope while reducing the possibility that start of the vehicle is delayed excessively due to excessive braking force.

Further, in the fifth to seventh embodiments, the target braking force Fbt may be gradually decreased non-linearly, and the decrease gradient of the target braking force Fbt in the case of the driving support control may be different from the decrease gradient in the case of the driver's driving operation. Also in these modifications, the target decrease gradient in the case of the driving support control may be smaller than the target decrease gradient in the case of the driver's driving operation.

Further, in the above-described embodiments, when an affirmative determination is made in step 20, the control proceeds to step 50. However, when an affirmative determination is made in step 20, a determination may be made as to whether or not a drive request is generated as in step 30, and if an affirmative determination is made, the control may proceed to step 50, but if a negative determination is made, the control may end once.

Further, in the above-described embodiments, the target braking forces Fbt are calculated according to the above equations (1) to (8). However, as long as the target braking force Fbt is reduced as shown ire FIGS. 4 to 10, the calculation of the target braking force Fbt may be performed according to equations other than the above equations (1) to (8).

Further, the first to third embodiments may be implemented in any combination, and the fifth to seventh embodiments may be implemented in any combination.

Further, although in the above-described embodiments, the braking device is a hydraulic braking device 16, the braking device may be an electromagnetic braking device as long as a braking force applied to the vehicle can be controlled by controlling a braking force applied to each wheel.

What is claimed is:

1. A braking force control apparatus for a vehicle comprising a braking device for applying a braking force to a vehicle and a control unit for controlling the braking device, and the control unit is configured to execute braking force holding control for controlling the braking device to hold the braking force applied to the vehicle when the vehicle is stopped in an uphill direction on a slope, and execute braking force reduction control for controlling the braking device so that the braking force is gradually reduced when it is determined that a drive request for driving the vehicle is generated during execution of the braking force holding control, wherein the vehicle has a driving support device configured to perform driving support control that automatically brakes and drives the vehicle without requiring a driver's braking/driving operation, the control unit is configured to control the braking device such that the braking force during execution of the braking force reduction control is larger when a drive request is generated by the driver's driving operation than when a drive request is generated by the driving support control.

2. The braking force control apparatus for a vehicle according to claim 1, wherein the vehicle has a required driving force estimation device configured to estimate a required driving force of the drive request in both cases where the drive request is generated by the driving support control and where the drive request is generated by a driver's driving operation, and the control unit is configured to calculate a target braking force which gradually decreases according to an increase of the estimated required driving force, and control the braking device such that the braking force applied to the vehicle becomes the target braking force.

3. The braking force control apparatus for a vehicle according to claim 1, wherein the vehicle has a lowering force estimation device configured to estimate a lowering force that cause the vehicle to descend along the slope due to gravity, and the control unit is configured to calculate a target braking force such that the target braking force at the time when a magnitude of a required driving force becomes equal to the lowering force is greater when the drive request is generated by the driving support control than when the drive request is generated by the driver's driving operation.

4. The braking force control apparatus for a vehicle according to claim 3, wherein the control unit is configured to calculate the target braking force when the drive request is generated by the driving support control to a value that is larger than the target braking force when the drive request is generated by the driver's driving operation.

5. The braking force control apparatus for a vehicle according to claim 4, wherein the control unit is configured to calculate a target braking force when the driving support control is being performed such that a difference between a target braking force when the drive request is generated by the driving support control and a target braking force when the drive request is generated by the driver's driving operation gradually decreases.

6. The braking force control apparatus for a vehicle according to claim 3, wherein the control unit is configured to calculate a target braking force such that a decrease rate of the target braking force when the drive request is generated by the driving support control is smaller than a decrease rate of the target braking force when the drive request is generated by the driver's driving operation.

7. The braking force control apparatus for a vehicle according to claim 3, wherein the control unit is configured to calculate a target braking force such that a target braking force when the drive request is generated by the driving support control is delayed with respect to a target braking force when the drive request is generated by the driver's driving operation.

8. The braking force control apparatus for a vehicle according to claim 1, wherein the control unit is configured to calculate a target braking force which gradually decreases in a preset first pattern when the drive request is generated by the driver's driving operation, calculate a target braking force which gradually decreases in a preset second pattern to be larger than a target braking force calculated in the first pattern when the drive request is generated by the driving support control, and control the braking device such that the braking force applied to the vehicle becomes the target braking force.

* * * * *